(12) United States Patent
Leib

(10) Patent No.: US 10,749,803 B1
(45) Date of Patent: Aug. 18, 2020

(54) ENHANCED CONGESTION AVOIDANCE IN NETWORK DEVICES

(71) Applicant: Marvell Israel (M.I.S.L) Ltd., Yokneam (IL)

(72) Inventor: Zvi Shmilovici Leib, Tel Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 43 days.

(21) Appl. No.: 16/049,717

(22) Filed: Jul. 30, 2018

Related U.S. Application Data

(60) Provisional application No. 62/682,040, filed on Jun. 7, 2018.

(51) Int. Cl.
*G01R 31/08* (2020.01)
*H04L 12/801* (2013.01)
*H04L 12/863* (2013.01)
*G06F 16/95* (2019.01)

(52) U.S. Cl.
CPC .............. *H04L 47/12* (2013.01); *G06F 16/95* (2019.01); *H04L 47/50* (2013.01)

(58) Field of Classification Search
CPC ......... H04L 47/10; H04L 47/30; H04L 47/11; H04L 47/32; H04L 49/3018; H04L 49/3027; H04L 47/50; H04L 49/00; H04L 49/3045
See application file for complete search history.

(56) References Cited

U.S. PATENT DOCUMENTS

| | | | |
|---|---|---|---|
| 6,957,269 B2 * | 10/2005 | Williams | H04L 12/5602 370/230 |
| 7,061,868 B1 * | 6/2006 | Ahlfors | H04L 47/10 370/236 |
| 8,520,517 B2 | 8/2013 | Kwan et al. | |
| 9,438,527 B2 * | 9/2016 | Shamis | H04L 47/58 |
| 9,705,808 B2 * | 7/2017 | Arumilli | H04L 47/11 |
| 2005/0195845 A1 | 9/2005 | Mayhew et al. | |
| 2005/0270974 A1 | 12/2005 | Mayhew | |

(Continued)

OTHER PUBLICATIONS

Chen, "Home Network Basis: Transmission Environments and Wired/Wireless Protocols," Prentice Hall, 26 pages (2006).

(Continued)

*Primary Examiner* — Hanh N Nguyen

(57) ABSTRACT

An upstream network device in a switching system processes packets an determines respective one or more egress ports of a downstream network device via which the packets are to be subsequently transmitted by the downstream network device. The upstream network device temporarily stores the packets in respective virtual output queues (VoQs) corresponding to the determined egress ports of the downstream network device. Responsively to receiving a flow control message indicating that particular one or more egress ports of the downstream network device are congested, the upstream network device modulates a flow of packets from particular one or more VoQs corresponding to the one or more particular congested egress ports of the downstream network device, to reduce congestion at the particular congested egress ports of the downstream network device, without modulating the flow of packets from other one or more VoQs corresponding to other egress ports of the downstream network device.

20 Claims, 5 Drawing Sheets

(56) References Cited

U.S. PATENT DOCUMENTS

| | | |
|---|---|---|
| 2006/0056308 A1 | 3/2006 | Gusat et al. |
| 2007/0047535 A1 | 3/2007 | Varma |
| 2007/0140282 A1 | 6/2007 | Lakshmanamurthy et al. |
| 2009/0003209 A1 | 1/2009 | Kalkunte et al. |
| 2009/0003212 A1 | 1/2009 | Kwan et al. |
| 2011/0044168 A1 | 2/2011 | N Das et al. |
| 2012/0263185 A1 | 10/2012 | Bejerano et al. |
| 2014/0177442 A1 | 6/2014 | Tanaka et al. |
| 2014/0241160 A1 | 8/2014 | Kwan et al. |
| 2015/0103667 A1 | 4/2015 | Elias et al. |
| 2016/0248675 A1 | 8/2016 | Zheng et al. |
| 2017/0339062 A1 | 11/2017 | Mayer-Wolf et al. |
| 2017/0339075 A1* | 11/2017 | Arad .................. H04L 49/9084 |
| 2018/0069795 A1 | 3/2018 | Shen et al. |
| 2019/0182161 A1 | 6/2019 | Ravi et al. |

OTHER PUBLICATIONS

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE Std 802.1Q™-2014 "(revision of IEEE Std. 802.1Q-2011) IEEE Standard for Local and metropolitan area networks—Bridges and Bridged Networks" IEEE Computer Society 1832 pages (2014).

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Qau, Amendment to IEEE Std 802 1Q-2005,"Virtual Bridged Local Area Networks—Amendment 13: Congestion Notification" The Institute of Electrical and Electronics Engineers, Inc., 135 pages, Apr. 2010.

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Std 802.1BR-2012 "IEEE Standard for Local and metropolitan area networks—Virtual Bridged Local Area Networks—Bridge Port Extension," The Institute of Electrical and Electronics Engineers, Inc., 135 pages (May 14, 2012).

IEEE Std 802.1Q™—2014 (Revision of IEEE Std.802.1Q-2011), "IEEE Standard for Local and Metropolitan Area Networks—Bridges and Bridged Networks," *The Institute of Electrical and Electronics Engineers, Inc.*, 1,832 pages (Nov. 3, 2014).

U.S. Appl. No. 16/050,085, Leib et al., "Enahnced Congestion Avoidance in Network Devices," filed Jul. 31, 2018.

U.S. Appl. No. 16/045,488, Leib et al., "Congestion Avoidance in a Network Switch Device," filed Jul. 25, 2018.

Office Action in U.S. Appl. No. 16/050,085, dated Jul. 31, 2018 (21 pages).

Notice of Allowance in U.S. Appl. No. 16/050,085, dated Nov. 20, 2019 (11 pages).

\* cited by examiner

| DMAC 202-1 | SMAC 202-2 | Ethertype 202-3 | MAC Control Opcode 202-4 | PortID 202-5 | Class-Enable Vector 202-6 | Per-Class Time 202-7a | ... | Per-Class Time 202-7z | PAD 202-8 | FSC 202-9 |

ENHANCED CONGESTION AVOIDANCE IN NETWORK DEVICES

CROSS-REFERENCES TO RELATED APPLICATIONS

This disclosure claims the benefit of U.S. Provisional Patent Application No. 62/682,040, entitled "Enhanced Virtual Output Queue (VOQ) Based Flow Control," filed on Jun. 7, 2018, which is hereby incorporated by reference herein in its entirety.

FIELD OF TECHNOLOGY

The present disclosure relates generally to network devices such as network devices, bridges, routers, switches, etc., and more particularly, to congestion avoidance in network devices.

BACKGROUND

A network device typically includes a plurality of ports coupled to different network links. The network device receives packets via ones of the ports and processes address information in a header of a received packet to decide via which other port or ports the network device should transmit the packet. While the network device performs processing of the packets and until egress interfaces are ready to transmit the packets, the packets are temporarily stored in an internal memory of the network device. When a determined port is available for transmission of a packet, the packet is retrieved from the internal memory and transmitted via the port.

In some situations, a downstream network device in a switching system receives packets from one or more upstream network devices in the switching system faster than the packets can be transmitted via at least some egress ports of the downstream network device. In such situations, the downstream network device (e.g., internal memory of the downstream network device) becomes congested due to an insufficiently high transmission rate of packets via the at least some egress ports of the downstream network device. To prevent loss of packets in case of congestion at the downstream network device, the downstream network device generates flow control messages that are subsequently transmitted to an upstream network device to thereby cause the upstream network device to modulate the flow of packets to the downstream network device. As an example, the upstream network device temporarily reduces the rate of transmission of packets to the network device to thereby alleviate congestion at the downstream network device. In a typical switching system, such flow control messages cause the upstream network device to modulate the flow of all packets to the downstream network device regardless of the egress ports of the downstream network device to which the packets are to be subsequently directed at the downstream network device. As a result, congestion at one egress port of the downstream network device unnecessarily causes flow control (e.g., reduction of transmission rate) of packets directed to other non-congested egress ports of the downstream network device.

SUMMARY

In an embodiment, a method for controlling flow of packets from an upstream network device in a switching system comprises: processing, by a packet processor of the upstream network device, packets to be transmitted to a downstream network device in the switching system, the processing including determining, based at least in part on forwarding information subsequently used for forwarding the packets by the downstream network device to one or more subsequent network devices, respective one or more egress ports, among a plurality of egress ports of the downstream network device, via which the packets are to be subsequently transmitted by the downstream network device to the one or more subsequent network devices; temporarily storing the packets in respective virtual output queues among a plurality of virtual output queues formed in a memory of the upstream network device, the respective virtual output queues corresponding to the determined one or more egress ports of the downstream network device; receiving, at the upstream network device, a flow control message from the downstream network device, the flow control message indicating that particular one or more egress ports among the plurality of egress ports of the downstream network device are congested; and responsively to the flow control message, modulating a flow of packets from particular one or more virtual output queues, among the respective virtual output queues, corresponding to the one or more particular congested egress ports of the downstream network device, to reduce congestion at the particular one or more congested egress ports of the downstream network device, without modulating the flow of packets from other one or more virtual output queues, among the plurality of virtual output queues, corresponding to other egress ports of the downstream network device.

In another embodiment, an upstream network device configured to operate in a switching system comprises at least one egress port for coupling to a downstream network device, a memory storing a plurality of virtual output queues, respective ones of the virtual output queues corresponding to respective ones of a plurality of egress ports of the downstream network device, and a packet processor implemented on one or more integrated circuits. The one or more integrated circuits are configured to process packets to be transmitted to the downstream network device including determining, based at least in part on forwarding information subsequently used for forwarding the packets by the downstream network device to one or more subsequent network devices, respective one or more egress ports, among a plurality of egress ports of the downstream network device, via which the packets are to be subsequently transmitted by the downstream network device to the one or more subsequent network devices; temporarily store the packets in respective virtual output queues, among the plurality of virtual output queues, corresponding to respective ones of the plurality of egress ports of the downstream network device, in the memory; receive a flow control message from the downstream network device, the flow control message indicating that particular one or more egress ports among the plurality of egress ports of the downstream network device are congested; and responsively to the flow control message, modulate a flow of packets from particular one or more virtual output queues, among the respective virtual output queues, corresponding to the one or more particular congested egress ports of the downstream network device, to reduce congestion at the particular one or more congested egress port of the downstream network device, without modulating the flow of packets from other one or more virtual output queues, among the plurality of virtual output queues, corresponding to other egress ports of the downstream network device.

In yet another embodiment, a method for controlling congestion in a downstream network device in a switching system comprises: receiving, via an ingress port of the downstream network device, packets from an upstream network device in the switching system; processing the packets with a packet processor of the downstream network device, the processing including determining, based at least in part on respective network addresses in headers of the packets, respective egress ports via which respective ones of the packets are to be transmitted by the downstream network device; forwarding, with the packet processor, the packets to the determined respective egress ports; monitoring, with the packet processor, respective congestion states of ones of the respective egress ports; determining, with the packet processor based on the monitoring of respective congestion states, that a particular egress port is congested; and in response to determining that the particular egress port is congested, generating, with the packet processor, a flow control message to include an indication of the particular congested egress port of the downstream network device, and triggering, with the packet processor, transmission of the flow control message via the ingress port to the upstream network device to cause the upstream network device to modulate a flow packets directed to the particular congested egress port of the downstream network device to reduce congestion at the particular congested egress port of the downstream network device without causing the upstream network device to modulate the flow of packets directed to other ones of the egress ports of the downstream network device.

In still another embodiment, a downstream network device configured to operate in a switching system comprises at least one ingress port for coupling to an upstream network device in the switching system, a plurality of egress ports, and a packet processor implemented on one or more integrated circuits. The one or more integrated circuits are configured to: process packets received, via the ingress port, from the upstream network device, the processing including determining, based on respective network addresses in headers of the packets, respective egress ports via which respective ones of the packets are to be transmitted by the downstream network device; forward the packets to the determined respective egress ports; monitor respective congestion states of ones of the respective egress ports; determine, based on the monitoring of respective congestion states, that a particular egress port is congested; and in response to determining that the particular egress port is congested, generate a flow control message to include an indication of the particular congested egress port of the downstream network device, and trigger transmission of the flow control message via the ingress port to the upstream network device to cause the upstream network device to modulate a of packets directed to the particular congested egress port of the downstream network device to reduce congestion at the particular congested egress port of the downstream network device without causing the upstream network device to modulate the flow of packets directed to other ones of the egress ports of the downstream network device.

In yet another embodiment, a switching system comprises a downstream network device having at least one ingress port and a plurality of egress ports. The switching system also comprises an upstream network device having at least one egress port for coupling to the downstream network device, and a memory storing a plurality of virtual output queues, respective ones of the virtual output queues corresponding to respective ones of the plurality of egress ports of the downstream network device. The downstream network device is configured to: process packets received, via the at least one ingress port, from the upstream network device, the processing including determining, based at least in part on respective network addresses in headers of the packets, respective egress ports via which respective ones of the packets are to be transmitted by the downstream network device; forward the packets to the determined respective egress ports; monitor respective congestion states of ones of the respective egress ports; determine, based on the monitoring of respective congestion states, that a particular egress port is congested; and in response to determining that the particular egress port is congested, generate a flow control message to include an indication of the particular congested egress port of the downstream network device, and trigger transmission of the flow control message via the ingress port to the upstream network device. The upstream network device is configured to: process packets to be transmitted to the downstream network device, including determining, based at least in part on forwarding information subsequently used for forwarding the packets by the downstream network device to one or more subsequent network devices, respective one or more egress ports, among the plurality of egress ports of the downstream network device, via which the packets are to be subsequently transmitted by the downstream network device to the one or more subsequent network devices; temporarily store the packets in respective virtual output queues among the plurality of virtual output queues, corresponding to respective ones of the plurality of egress ports of the downstream network device, in the memory; receive the flow control message from the downstream network device; and responsively to the flow control message, modulate a flow of packets from particular one or more virtual output queues, among the respective virtual output queues, corresponding to particular congested egress ports of the downstream network device, to reduce congestion at the particular congested egress port of the downstream network device, without modulating the flow of packets from other one or more virtual output queues, among the plurality of virtual output queues, corresponding to other egress ports of the downstream network device.

BRIEF DESCRIPTION OF THE DRAWINGS

FIG. 2 is a block diagram of an example flow control message, according to an embodiment;

DETAILED DESCRIPTION

In embodiments described below, an upstream network device in a switching system implements flow control to modulate the flow of packets from the upstream network device to a downstream network device in the switching system, for example to prevent loss of packets due to congestion in the downstream network device in the switching system. In an embodiment, the upstream network device implements flow control based on flow control messages received from a congested downstream network device to independently modulate the flow of packets directed to particular one or more congested egress interfaces (e.g., ports) of the downstream network device, without modulating flow of packets directed to other, non-congested egress interfaces (e.g., ports) of the downstream network device. To enable independent control of flow of packets directed to particular egress ports of the downstream network device, in an embodiment, the upstream network device implements virtual output queues (VoQs) to independently queue packets, to be transmitted to the downstream network device, that are directed to respective egress ports of the downstream network device. In an example, this is performed based on knowledge, at the upstream network device, of the egress port at the downstream network device through which a packet is to be subsequently egressed from the downstream network device. The downstream network device, in turn, independently monitors congestion at respective egress ports of the downstream network device, and, in response to detecting congestion at one or more particular egress ports, generates and transmits a flow control message to the upstream network device indicating the particular one or more congested egress ports of the downstream network device, in an embodiment. When the upstream network device receives a flow control message from the downstream network device indicating that one or more particular egress ports of the downstream network device are congested, the upstream network device modulates flow of packets from one or more VoQs corresponding to the particular one or more egress ports of the downstream network device, to reduce congestion at the particular one or more egress ports of the downstream network device, without modulating the flow of packets from other one or more VoQs corresponding to one or more egress ports of the downstream network device that are not indicated to be congested. These and other flow control techniques described herein allow network devices in the switching system to efficiently control flows of packets directed to only those egress ports of downstream network devices that are congested, without negatively impacting (e.g., blocking or rate limiting) flow of packets directed to egress ports of the downstream network devices that are not congested, thereby more efficiently utilizing the network link while maintaining lossless transmission of packets through the switching system, in at least some embodiments.

Figure 1:
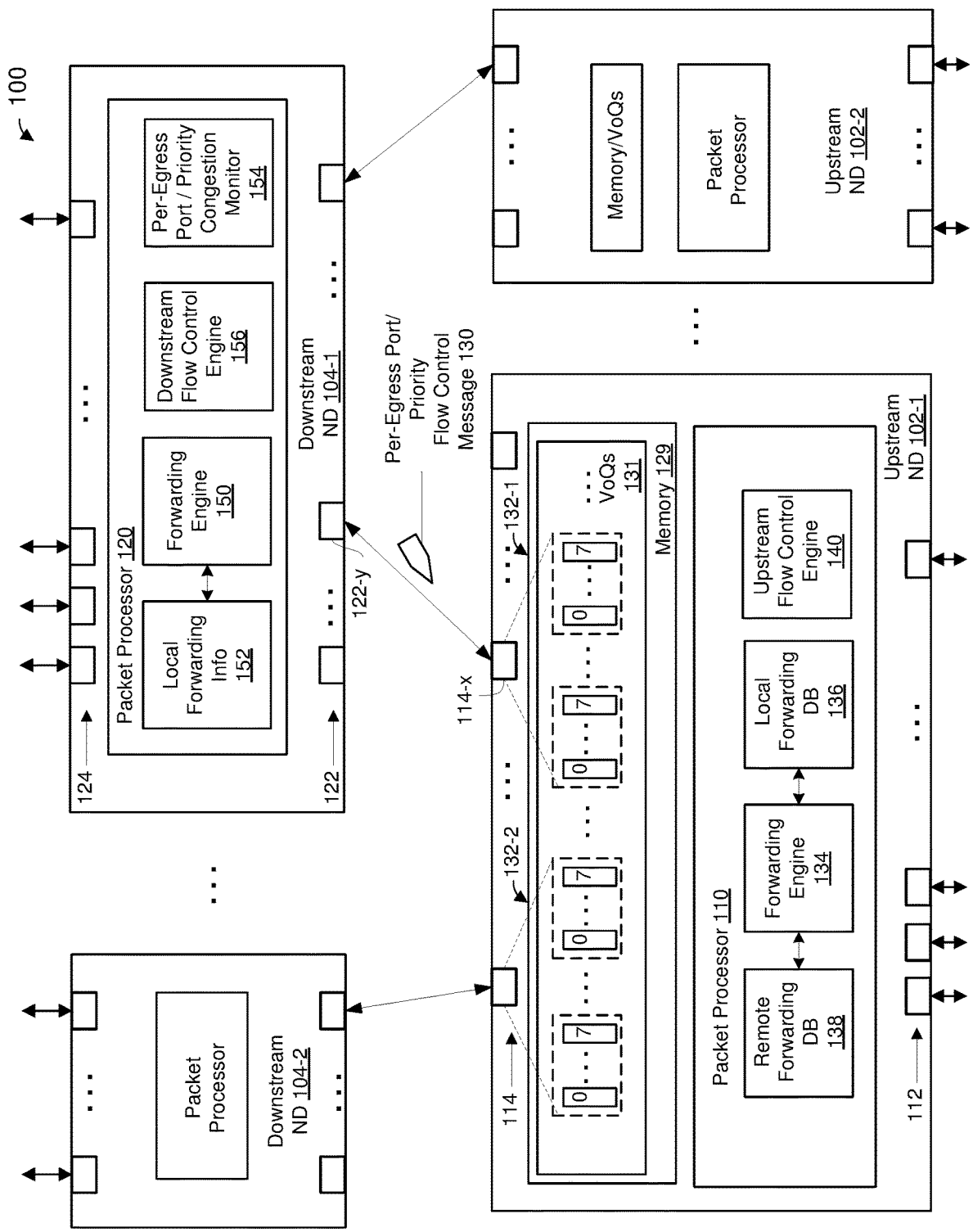
FIG. 1 is a block diagram of an example switching system configured to implement flow control techniques described herein, according to an embodiment.

FIG. 1 is a block diagram of an example switching system 100 configured to implement flow control techniques described herein, according to an embodiment. In an embodiment, the switching system 100 is part of a data center network, a server farm network, or another suitable system that requires switching or routing between a large number of network interfaces (e.g., ports). In another embodiment, the switching system 100 is part of a network other than a datacenter network. For example, the switching system 100 is part of an enterprise network, in some embodiments. The switching system 100 includes a plurality of first network devices 102 and a plurality of second network devices 104. In an example embodiment in which the switching system 100 is part of a data center network, the first network devices 102 are top of the rack (ToR) devices in the datacenter network and the second network devices 104 are spine device in the datacenter network. In other embodiments, the first network devices 102 and the second network devices 104 are arranged in other suitable configurations.

The first network devices 102 are located upstream from the second network devices 104 with respect to packets flowing through the switching system 100 in the direction from the first network devices 102 to the second network devices 104, and a respective first network device 102 is sometimes referred to herein as an "upstream network device." Similarly, the second network devices 104 are located downstream from the first network devices 102 with respect to packets flowing through the switching system 100 in the direction from the first network devices 102 to the second network devices 104, and a respective second network device 104 is sometimes referred to herein as a "downstream network device." For ease of explanation, upstream flow control functionality is described herein with respect to the first (upstream) network device 102 and downstream flow control functionality is described herein with respect to the second (downstream) network device 104. It is noted, however, that in some configurations a first network device 102 also acts as an downstream network device with respect to packets flowing through the switching system 100 in the direction from a second network device 104 to the first network device 102, and a second network device 104 also acts as an upstream network device with respect to packets flowing through the switching system 100 in the direction from the second network device 104 to a first network device 102, in some embodiments. This is not shown in order to avoid obfuscating teaching qualities of the figures and description. Accordingly, in various embodiments, each of the first network devices 102 and the second network devices 104 includes upstream flow control functionality generally described herein with respect to the first network device 102 as well as the downstream flow control functionality generally described herein with respect to the second network device 104.

In an embodiment, each of the upstream network devices 102 has a structure the same as, or similar to, the upstream network device 120-1, and thus all of the upstream network devices 102 are not described in detail for illustrative purposes. Similarly, in an embodiment, each of the downstream network devices 104 has a structure the same as, or similar to, the second network device 104-1, and thus all of the downstream network devices 104 are not described in detail for illustrative purposes.

The upstream network device 102-1 includes a packet processor 110 coupled to a plurality of ports 112, 114. The ports 112 of the upstream network device 102-1 are coupled to respective other network devices, such as other switching devices in the switching system 100, end-point devices (e.g., servers, data storage devices, etc.), devices within networks other than the switching system 100, etc., in an embodiment. The ports 114 of the upstream network device 102-1 are coupled to respective downstream network devices in the switching system 100, such as next hop switching devices or next-stage switching devices in the switching system 100, in an embodiment.

The ports 112 of the upstream network device 102-1 act as ingress ports with respect to packets flowing through the network 100 in the direction from the upstream network device 102-1 to the downstream network device 104-1, and the ports 112 are sometimes referred to herein as "ingress ports." The ports 114 act as egress ports with respect to packets flowing through the network 100 in the direction from the upstream network device 102-1 to the downstream network device 104-1, and the ports 114 are sometimes referred to herein as "egress ports." It is noted, however, that each of the ports 112, 114 acts as both an ingress port for packets entering the network device 102-1 via the port 112, 114 and an egress port for packets egressing the network device 102-1 via the port 112, 114, in some embodiments.

With continued reference to FIG. 1, the downstream network device 104-1 includes a packet processor 120 coupled to a plurality of ports 122, 124. The ports 122 of the downstream network device 104-1 are coupled via respective network links to respective upstream network devices, in an embodiment. The ports 124 of the downstream network device 104-1 are coupled to respective subsequent network devices, such as next hop switching devices, next-stage switching devices, previous-stage switching devices, etc. in the switching system 100, in an embodiment.

The ports 122 act as ingress ports of the downstream network device 104-1 with respect to packets flowing through the network 100 in the direction from the upstream network device 102-1 to the downstream network device 104-1, and the ports 122 are sometimes referred to herein as "ingress ports." The ports 124 act as egress ports of the downstream network device 104-1 with respect to packets flowing through the network 100 in the direction from the upstream network device 102-1 to the downstream network device 104-1, and the ports 124 are sometimes referred to herein as "egress ports." It is noted, however, that each of the ports 122, 124 acts as both an ingress port for packets entering the network device 104-1 via the port 122, 124 and an egress port for packets egressing the network device 104-1 via the port 122, 124, in some embodiments.

The packet processor 110 of the upstream network device 102-1 is coupled to a memory 129 storing a plurality of virtual output queues (VoQ) 131, in an embodiment. According to an embodiment, the plurality of VoQs 131 includes a plurality of sets of VoQs 132, with respective sets of VoQs 132 corresponding to i) respective egress ports 114 of the upstream network device 102-1 and ii) respective egress ports 124 of downstream network devices coupled to the corresponding respective egress ports 114 of the upstream network device 102-1. For example, a set of VoQs 132-1 corresponds to the egress port 114-x of the upstream network device 102-1, with respective subsets of VoQs 132 corresponding to respective egress ports 124 of the downstream network device 104-1, in an embodiment. In an embodiment, each of at least some of the subsets of VoQs 132 includes multiple VoQs 132 corresponding to different priorities associated with packets flowing through the switching system 100. In the example embodiment of FIG. 1, the switching system 100 supports up to eight different priorities, and each subsets of VoQs 132-1 includes up to eight VoQs 132 respectively corresponding to ones of the eight packet priorities. In other embodiments, other suitable numbers of different priorities are utilized.

In an embodiment, the packet processor 110 of the upstream network device 104-1 is configured to process information in a packet received via an ingress port 112 of the upstream network device 102-1 to determine one or more egress ports 114 of the upstream network device 102-1 to which the packet is to be forwarded, in an embodiment. Additionally, the packet processor 110 is configured to determine one or more egress ports of one or more downstream network devices, coupled to the determined one or more egress ports 114 of the upstream network device 102-1, to which the one or more downstream network devices are to subsequently forward the packet, in an embodiment. When a packet is ready to be egressed from the upstream network device 102-1, the packet processor 110 places the packet into or more virtual output queues 131 in the memory 129 corresponding to the determined one or more egress ports of the downstream network device to which the packet is to be forwarded.

In an embodiment, the packet processor 110 includes a forwarding engine 134 that is configured to analyze a network address in a packet received via an ingress port 112 to determine i) one or more local egress ports 114, of the upstream network device 102-1, to which to forward the packet for transmission to one or more downstream network devices and ii) one or more remote egress ports of one or more downstream network devices to which the packet is to subsequently be forwarded by the one or more downstream network devices. In an embodiment, the forwarding engine 134 is coupled to a local forwarding database 136 and one or more remote forwarding databases 138. The local forwarding database 136 stores associations between network addresses and local egress ports 114 to which packets that include the network addresses are to be forwarded, in an embodiment. The forwarding engine 134 is configured to access the local forwarding database 136 based on a network address in a packet to obtain indications of one or more egress ports 114 to which to forward the packet, in an embodiment. In some embodiments, the local forwarding database 136 stores associations between at least some network addresses and egress interfaces that include multiple possible egress ports 114 for forwarding packets that include the network addresses. In some such embodiments, the forwarding engine 134 is configured to utilize a suitable load balancing technique to select one or more of the egress ports 114, among the multiple possible egress ports, to which to forward a packet. For example, in an embodiment, the forwarding engine 134 is configured to apply a suitable hash function to one or more fields in a header of a packet to select one or more egress ports 114, among the multiple possible egress ports 114, to which to forward the packet.

The one or more remote forwarding databases 138 store associations between i) network addresses and ii) egress ports of downstream network devices to which the packets that include the addresses are to be subsequently forwarded by the downstream network devices, in an embodiment. In some embodiments, the forwarding engine 134 is coupled to multiple remote forwarding databased 138 corresponding to respective ones of the local egress ports 114 and storing forwarding information corresponding to respective downstream network devices coupled to the corresponding ones of the local egress ports 114. In an embodiment, upon determining a local egress port 114 to which a packet is to be forwarded, the forwarding engine 134 accesses a remote forwarding database 138 corresponding to the local egress port 114 and obtains, based on a network address in the packet, indications of one or more remote egress ports to which the packet is to subsequently be forwarded by a downstream network device coupled to the local egress port 114. Although the local forwarding database 136 and the remote forwarding database 138 are illustrated in FIG. 1 as being separate from each other, the local forwarding database 136 and the remote forwarding database 138 are integrated into a single forwarding database that provides, based on a network address, an indication of a local ingress port or interface and indications one or more egress ports of a downstream network device coupled to the local ingress port or interface in some embodiments.

In the example scenario of FIG. 1, an egress port 114-x of the upstream network device 102-1 is coupled, via an ingress port 122-y, to the downstream network device 104-1. The forwarding engine 134 determines, based at least in part on accessing the local forwarding database 136 using a network address in a received packet, that the packet is to be forwarded to the egress port 114-*x* coupled to the downstream network device 104-1, in an embodiment. The forwarding engine 134 then accesses, based on the network address in the packet, the remote forwarding database 138 corresponding to the egress port 114-*x* and obtains, from the remote forwarding database 138, indications of one or more egress ports 124, or egress interfaces that include multiple one of egress ports 124, to which the downstream network device 104-1 is to subsequently forward the packet, in an embodiment. In some embodiments in which the forwarding engine 134 obtains an indication of an egress interface that includes multiple egress ports 124, the forwarding engine 134 utilizes a load balancing technique (e.g., a hashing technique), that is to be subsequently utilized by the downstream network device 104-1, to select an egress port 124 to which the packet is to subsequently be forwarded by the downstream network device 104-1. The packet processor 110 of the upstream network device 102-1 then temporarily stores the packet into one or more VoQs 132 corresponding to the determined one or egress ports 124 of the downstream network device 104-1, for subsequent transmission of the packets to the downstream network device 104-1, in an embodiment. In some embodiments, the packet processor 110 determines a priority with which the packet is associated, and temporarily stores the packet in a VoQs 132 that i) corresponds to an egress port 124 to which the packet is to be forwarded by the downstream network device 104-1 and ii) is associated with the priority of the packet.

In an embodiment, the packet processor 110 also includes an upstream flow control engine 140 configured to modulate transmission of packets from respective VoQs 131 in response to flow control messages received by the upstream network device 102-1 from downstream network devices coupled to the upstream network device 102-1. In an embodiment, a flow control message received by the upstream network device 102-1 from a downstream network device indicates particular one or more congested egress ports of the downstream network device. In response to the flow control message, the flow control engine 140 of the upstream network device 102-1 modulates flow of packets from one or more VoQs 131 corresponding to the particular one or more egress ports of the downstream network device, without modulating the flow of packets from other VoQs 131 corresponding to other, non-congested, egress ports of the downstream network device, in an embodiment.

Turning now to the downstream network device 104-1, in an embodiment, the packet processor 120 of the downstream network device 104-1 is configured to utilize information in packets received via the ingress ports 122, and/or metadata corresponding to the packets, to determine one or more egress ports 124 to which to forward the packets. The packet processor 120 includes a forwarding engine 150 coupled to a local forwarding database 152, in an embodiment. The local forwarding database 152 stores associations between i) network addresses and ii) egress ports 124 to which packets that include the network addresses are to be forwarded, in an embodiment. The forwarding engine 150 is configured to access the local forwarding database 152 based on a network address in a packet to obtain indications of one or more egress ports 124 to which to forward the packet, in an embodiment. In some embodiments, for at least some of the network addresses, the local forwarding database 152 stores associations between i) a network address and ii) an egress interfaces that includes multiple possible egress ports 124 for forwarding packets that include the network address. In some such embodiments, the forwarding engine 150 is configured to utilize a suitable load balancing technique to select one or more of the egress ports 124, among the multiple possible egress ports 124, to which to forward the packet. For example, in an embodiment, the forwarding engine 150 is configured to apply a suitable hash function to one or more fields in a header of the packet to select one or more egress ports 124, among the multiple possible egress ports 124, to which to forward the packet.

The packet processor 120 also includes a per-egress port and/or priority congestion monitor unit (sometimes referred to herein as simply "congestion monitor unit") 154 and a downstream flow control engine 156, in an embodiment. The congestion monitor unit 154 is configured to monitor respective congestion states of respective egress ports 124 of the downstream network device 104-1 and/or congestion states of respective network links coupled to the respective egress ports 124 of the downstream network device 104-1, in an embodiment. In some embodiment, the congestion monitor unit 154 is configured to monitor a congestion state of each respective egress port 124 with respect to packets associated with a plurality of different priorities or classes. In various embodiments, the congestion monitor unit 154 is configured to monitor respective congestion states of ones of the respective egress ports 124 and, in some embodiments, with respect to packets of respective priorities or classes, independently from monitoring congestion states of other ones of the egress ports 124 and, in some embodiments, with respect to packets of other priorities.

In an embodiment, the congestion monitor unit 154 monitors congestion states of respective egress ports 124 by monitoring an amount of data, or number of packets, stored in a packet memory (not shown) configured to temporarily store packets received by the downstream network device 104-1 via the ingress ports 122 while the packets are being processed by the downstream network device 104-1. To monitor congestion states of respective ones of egress ports 124 and/or respective priorities independently of other ones of the egress ports 124 and/or other priorities, the congestion monitor unit 154 maintains separate counters to account for packets stored in the packet memory that are directed to the respective ones of the egress ports 124 and/or are associated with different priorities, in an embodiment. When the packet processor 120 determines, for example, that a packet stored in the packet memory is directed to a particular egress port 124 and is associated with a particular priority, the congestion monitor unit 154 increments a counter corresponding to the particular egress port 124 and the particular priority to account for the packet, in an embodiment. In some embodiments, the congestion monitor unit 154 maintains a separate counter for each ingress/egress port pair to account for packets stored in the packet memory that i) were received at a particular ingress port 122 and ii) are directed to a particular egress port 104-1. When the packet processor 120 forwards a packet stored in the packet memory to a particular egress port 124 and associated with a particular priority, the congestion monitor unit 154 decrements a counter corresponding to the particular egress port 124 and the particular priority, in an embodiment. To determine whether a particular egress port 124 is congested with respect to packets associated with a particular priority, the congestion monitor unit 154 compares a value of the counter corresponding to the particular egress ports 124 and the particular priority to a predetermined threshold, in an embodiment. In response to determining that a counter corresponding to a particular egress port 124 and a particular priority exceeds the predetermined threshold, the congestion monitor unit 154 determines that the particular egress port 124 is congested with respect to packets associated with the particular priority, in an embodiment. In an embodiment in which the counter corresponds to an ingress/egress port pair, the congestion monitor unit 154 determines that the particular egress port 124 is congested by packets (e.g., associated with a particular priority) received the particular ingress port 122.

In some embodiments, congestion monitor unit 154 is configured to monitor congestion states of respective egress ports 124 by monitoring respective fill levels of output queues (e.g., associated with different priorities) corresponding to the respective egress ports 124. In an embodiment, when a fill level of an output queue corresponding to a particular egress port 124, or a fill level of an output queue corresponding to a particular egress port 124 and a particular priority, exceeds a predetermined threshold, then the congestion monitor unit 154 determines, respectively, that the particular egress ports 124 is congested, or that the particular egress ports 124 is congested with packets corresponding to the particular priority. In some embodiments, the congestion monitor unit 154 probabilistically determines that a particular egress port 124 is congested or is congested with packets corresponding to a particular priority, with the probability of determining that the particular egress port 124 is congested increasing along with an increasing fill level of the corresponding output queue.

In response to determining that one or more egress ports 124 and/or one or more network links coupled to the one or more egress ports 124 are congested, the downstream flow control engine 156 generates a flow control message, such as a modified priority flow control (PFC) message, a quantized congestion notification (QCN) message or another suitable type of message, in an embodiment. The downstream flow control engine 156 generates the flow control message to include indications of the one or more congested egress ports 124 and, in an embodiment. The downstream flow control engine 156 triggers transmission of the flow control message to one or more upstream network devices via one or more ingress ports 122 to cause one or more upstream network devices coupled to the one or more ingress ports 122 to modulate flow of packets, or packets of specific priorities, to the particular one or more congested egress ports 124 to reduce congestion at the particular one or more egress ports 124, without modulating the flow of packets directed to other, non-congested, egress ports 124 and/or packets of other priorities, in an embodiment. In an embodiment in which the congestion monitor unit 154 determines that an egress port 124 is congested without separately counting packets received via different ones of the ingress ports 122, the downstream flow control engine 156 triggers transmission of the flow control message via each of the ingress ports 122. In another embodiment, in which the congestion monitor unit 154 determines that a particular egress port 124 is congested by packets received the particular ingress port 122, e.g., based separately counting packets received via different ones of the ingress ports 122, the downstream flow control engine 156 triggers transmission of the flow control message via the particular ingress port 122 without triggering transmission of the flow control engine via other ones of the ingress ports 122.

In FIG. 1, the downstream flow control engine 156 generates and transmits a per-egress port and/or priority flow control message (sometimes referred to herein as simply "flow control message") 130 via the ingress port 122-y to the upstream network device 102-1. The flow control message 130 indicates one or more egress ports 124 of the downstream network device 104-1, and in some embodiments, one or more particular priorities, that were determined to be congested by the congestion monitor unit 154, in an embodiment. In an embodiment, the flow control message 130 is a PFC message that generally conforms to the PFC message format defined by the IEEE 802.1 protocol but is modified to include one or more fields indicating particular one or more congested egress ports 124. In another embodiment, the flow control message 130 is QCN message that conforms to the IEEE 802.1Qau protocol, the QCN message being statistically generated based on a fill level of a corresponding output queue. In an embodiment, the flow control message 130 inherently includes an indication of a particular congested egress port 124, e.g., as indicated by source and destination port information included in a standard QCN message defined by the IEEE 802.1Qau protocol.

The upstream network device 102-1 receives the flow control message 130 transmitted by the downstream network device 104-1, in an embodiment. In response to the flow control message 130, the upstream flow control engine 140 of the upstream network device 102-1 modulates flow of packets from one or more VoQs 132 corresponding to the one or more congested egress ports 124 and, in some embodiments, one or more specific priorities indicated in the flow control message 130, without modulating flow of packets from other VoQs 132-1 corresponding to other egress ports 124 and/or other priorities. In an embodiment, the flow control engine 140 modulates transmission of packets from one or more VoQs 132-1 by temporarily suspending transmission of packets from the one or more VoQs 132-1 and subsequently resuming transmission of packets from the one or more VoQs 132-1, for example after expiration of a period of time (e.g., pause time) indicated in the flow control message 130 or in response to a subsequent flow control message from the downstream network device 104-1 instructing to resume transmission. In another embodiment, the upstream flow control engine 140 modulates transmission of packets from one or more VoQs 132-1 by temporarily reducing the rate of transmission of packets from the one or more VoQs 132-1 and then gradually increasing the rate. As an example, the upstream flow control engine 140 drops the transmission rate to a certain value, such as one half of the current transmission rate at the time of receipt of the flow control message 130, and then gradually increases the rate until a maximum transmission rate is reached or until another flow control message is received. In other embodiments, the upstream flow control engine 140 modulates transmission of packets from one or more VoQs 132-1 in other suitable manners that result in reduction of congestion at the one or more egress ports 124.

FIG. 2 is a block diagram of a flow control message 200, according to an embodiment. In an embodiment, the flow control message 200 corresponds to a flow control message (e.g., the flow control message 130) transmitted from the downstream network device 104-1 to the upstream network device 102-1 of the system 100 of FIG. 1, and, for exemplary purposes, the flow control message 200 is described with reference to the downstream network device 104-1 and the upstream network device 102-1 of the switching system 100 of FIG. 1. However, the flow control message 200 is utilized with suitable network devices different from the downstream network device 104-1 and/or the upstream network device 102-1 of the system 100 of FIG. 1 and/or is utilized with suitable switching systems different from the switching system 100 of FIG. 1, in some embodiments.

The flow control message 200 is a modified PFC flow control message, in an embodiment. The flow control message 200 includes a plurality of fields 202 including a destination media access control (DMAC) address field

202-1, a source MAC (SMAC) address field 202-2, and Ethertype field 202-3, MAC control opcode field 202-4, a port identification (ID) field 202-5, a class-enable vector field 202-6, a plurality of class time fields 202-7, a padding field 202-8, and a frame check sequence (FCS) field 202-9, in an embodiment. In some embodiments, the flow control message 200 omits one or more of the fields 202 illustrated in FIG. 2 and/or includes one or more additional fields not illustrated in FIG. 2.

In an embodiment, the DMAC address field 202-1 and the SMAC address field 202-4 of the flow control message 200 include the MAC address of, respectively, the destination network device of the flow control message 200 (e.g., the upstream network device 102-1) and the source network device of the flow control message 200 (e.g., the downstream network device 104-1), in an embodiment. The Ethertype field 202-3 is set to indicate a type of the flow control message type 200, in an embodiment. For example, the Ethertype field 202-3 is set to the value 0x8808 to indicate that the message 200 is an Ethernet flow control message, in an embodiment. In another embodiment, the Ethertype field 202-3 is set to another suitable value to indicate that the message 200 is of flow control message type. The MAC control opcode field 202-4 is set to indicate that the message 200 is a modified PFC message, in an embodiment.

In an embodiment, the PortID field 202-5 of the flow control message 200 is set to identify one or more congested ports at the source network device of the flow control message 200. In an embodiment, the PortID field 202-5 is set to indicate one or more congested ports 124 of the upstream network device 104-1. For example, the PortID field 202-5 includes respective IDs associated with the one or more congested ports 124 of the upstream network device 104-1, in an embodiment. In another embodiment, the PortID field 202-5 includes a bitmap with respective bits corresponding to respective ones of the ports 124. In this embodiment, each bit in the bitmap is set to one of (i) a first value (e.g., a logic zero) to indicate that the corresponding port 124 is congested and or (ii) a second value (e.g., a logic one) to indicate that the corresponding port 124 is not congested. In other embodiments, the PortID field 202-5 identifies one or more congested ports 124 in other suitable manners.

The class-enable vector field 202-6 is set to indicate one or more classes, or priorities, with respect to which the one or more ports identified in the PortID field 202-5 are congested, in an embodiment. In an embodiment, the flow control message 200 includes multiple class-enable vector fields 202-6, with respective ones of the multiple class-enable vector fields 202-6 corresponding to respective ones of the ports 124. In an embodiment, a respective one of the multiple class-enable vector fields 202-6 is set to indicate one or more classes, or priorities, with respect to which a particular port identified in the PortID field 202-5 is congested. Respective ones of the plurality of class time fields 202-7 are set to indicate respective pause times for respective classes or priorities to be used for temporary suspension of packets associated with the corresponding classes or priorities. In an embodiment, the flow control message 200 includes multiple sets of class time fields 202-7, with respective ones of the multiple sets of class time fields 202-7 corresponding to respective ones of the ports 124. In an embodiment, a respective one of the multiple sets of class time fields 202-7 indicate respective pause times for respective classes or priorities for temporary suspension of packets (i) associated with the corresponding classes or priorities and (ii) directed to the respective ones of the ports 124.

Figure 3:
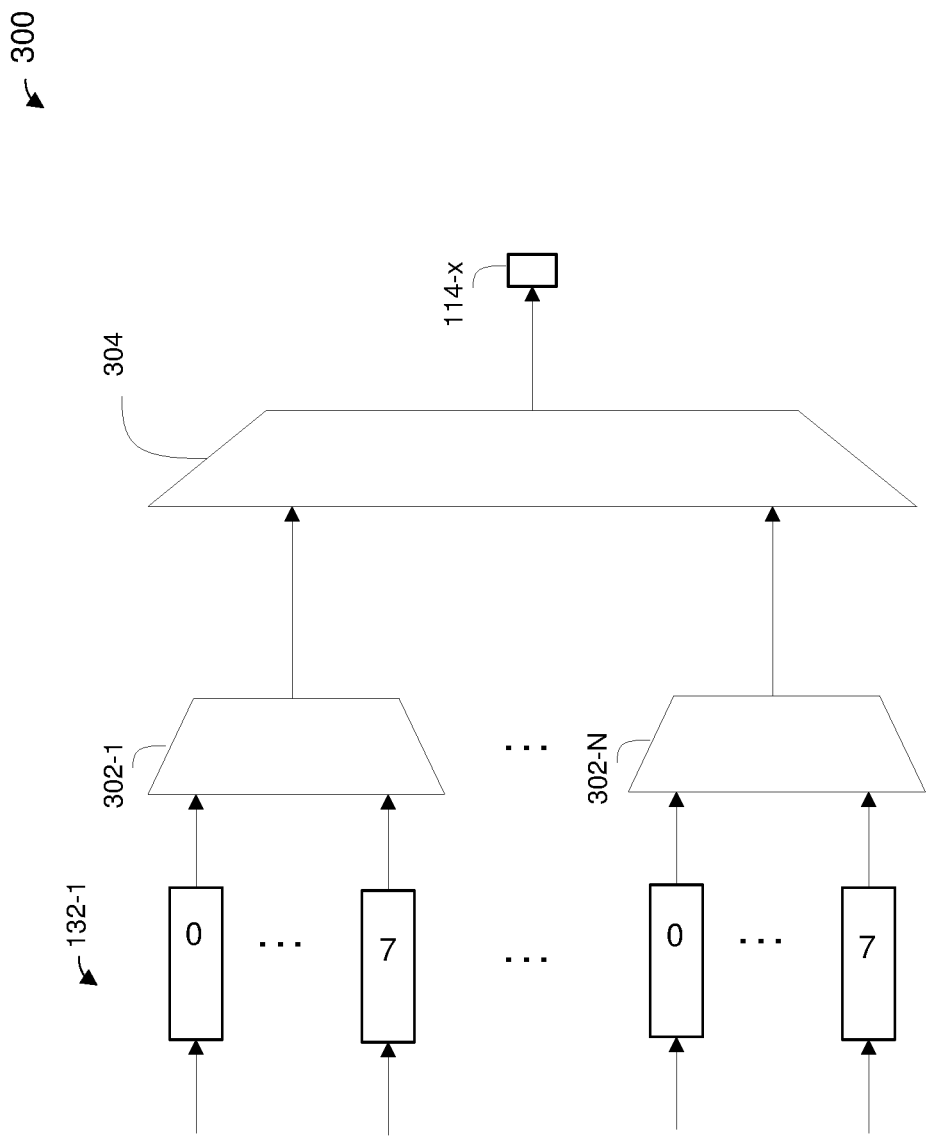
FIG. 3 is a block diagram of a scheduling system configured to schedule transmission of packets from virtual output queues, according to an embodiment.

FIG. 3 is a block diagram of a scheduling system 300 configured to schedule transmission of packets from virtual output queues, according to an embodiment. In an embodiment, the scheduling system 300 corresponds to a particular egress port of an upstream network device and is configured to schedule transmission of packets from virtual output queues via the particular egress port of the upstream network device. In an embodiment, the upstream network device 102-1 of the switching system 100 of FIG. 1 includes a respective scheduling system, such as the scheduling system 300, corresponding to each egress port 114 of the upstream network device 102-1. In an exemplary embodiment, the scheduling system 300 corresponds to the egress port 114-$x$ of the upstream network device 102-1 of the switching system 100 of FIG. 1 and controls transmission of packets from the egress port 114-$x$ to the downstream network device 104-1. Accordingly, for exemplary purposes, the scheduling system 300 is described with reference to the egress port 114-$x$ of the upstream network device 102-1 of the switching system 100 of FIG. 1 and the downstream network device 104-1 of the switching system 100 of FIG. 1. However, the scheduling system 300 is utilized with suitable network devices different from the downstream network device 104-1 and/or the upstream network device 102-1 of the system 100 of FIG. 1 and/or is utilized with suitable switching systems different from the switching system 100 of FIG. 1, in some embodiments.

The scheduling system 300 includes a plurality of priority VoQ schedulers 302 and an egress port scheduler 304, in the illustrated embodiment. Respective ones of the priority VoQ schedulers 302 schedule transmission of packets from respective VoQs, in respective sets of VoQs 132-1, corresponding to respective priorities, in an embodiment. The egress port scheduler 304 schedules transmission of packets from respective sets of VoQs 132-1 corresponding to respective egress ports 124 of the downstream network device 104-1, in an embodiment. In an embodiment, the upstream flow control engine 140 controls operation of the priority VoQ schedulers 302 and the egress port scheduler 304 to modulate the flow of packets from particular VoQs 132-1 based on flow control messages, such as the flow control message 130, received from the downstream network device 104-1. The upstream flow control engine 140 modulates the flow of packets from a particular VoQ corresponding to a particular port 124 of the downstream network device 104-1 and a particular priority, indicated in a flow control message, by, for example, controlling the scheduling system 300 to implement a scheduling scheme that modulates (e.g., suspends or reduces frequency of) selection, by the corresponding priority VoQ scheduler 302, of the particular VoQ corresponding to the particular priority when the set of VoQs corresponding to the particular port 124 is selected by the egress port scheduler 304, in an embodiment.

Figure 4:
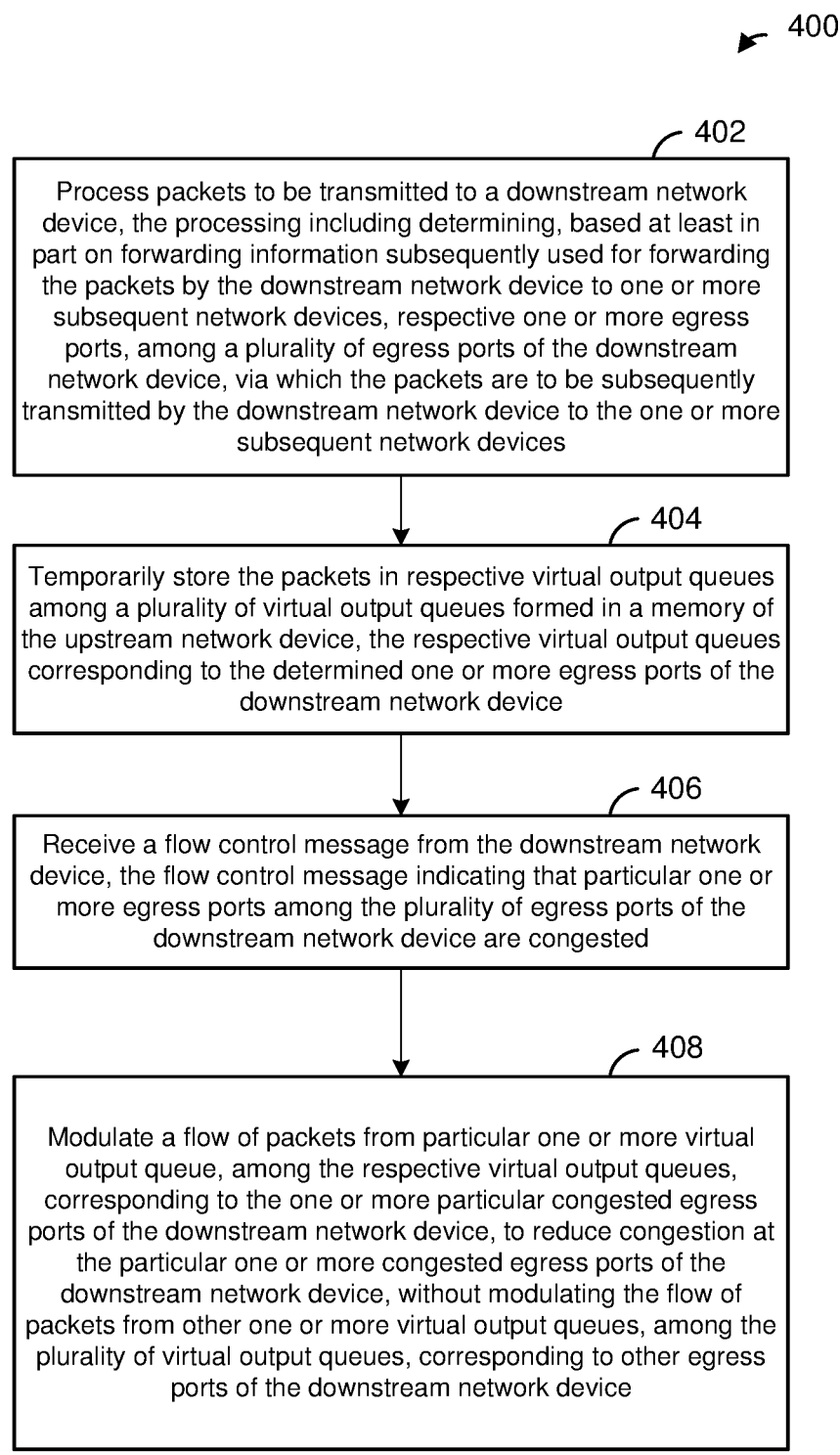
FIG. 4 is a flow diagram illustrating an example method for controlling flow of packets from an upstream network device in a switching system, according to an embodiment.

FIG. 4 is a flow diagram illustrating an example method 400 for controlling flow of packets from an upstream network device in a switching system, according to an embodiment. In an embodiment, the method 400 is implemented by the upstream network device 102-1 of the switching system 100 of FIG. 1, and, for ease of explanation, the method 200 is described below with reference to the upstream network device 102-1 of the switching system 100 of FIG. 1. However, the method 200 is implemented by suitable network devices different from the upstream network device 102-1 of the switching system 100 of FIG. 1 and/or is implemented in switching systems different from the switching system 100 of FIG. 1, in other embodiments.

At block 402, packets to be transmitted to the downstream network device 104-1 are processed at the upstream network device 102-1. For example, the packet processor 110 of the upstream network device processes the packets, in an embodiment. In other embodiments, other suitable components of the upstream network device 102-1 or suitable network devices other than the upstream network device 102-1 process the packets. In an embodiment, processing the packets at block 402 includes determining respective one or more egress ports, among a plurality of egress ports of the downstream network device, via which the packets are to be subsequently transmitted by the downstream network device to one or more subsequent network devices. For example, processing the packets at block 402 includes determining respective one or more egress ports 124, among the plurality of egress ports 124 of the downstream network device 104-1, via which the packets are to be subsequently transmitted by the downstream network device 104-1 to one or more subsequent network devices coupled to the egress ports 124, in an embodiment.

In an embodiment, determination of the respective one or more ports of the downstream network device at block 402 is made based at least in part on forwarding information subsequently used for forwarding the packets by the downstream network device to one or more subsequent network devices. In an embodiment, determination of the respective one or more ports of the downstream network device is made at least in part by accessing, based on a network address in a packet, a remote forwarding database (e.g., the remote forwarding database 138) maintained at the upstream network device, and obtaining, from the remote forwarding database, indications of the respective one or more ports of the downstream network device. In an embodiment, the remote forwarding database maintained at the upstream network device corresponds to a forwarding database used for forwarding packets by the downstream network device, to determine egress ports via which the packets are to be transmitted by the downstream network device.

At block 404, the packets are temporarily stored in respective virtual output queues among a plurality of virtual output queues formed in a memory of the upstream network device, the respective virtual output queues correspond to the determined one or more egress ports of the downstream network device. For example, the packets are stored in respective virtual output queues 132 corresponding to respective egress ports 124 of the downstream network device 104-1, in an embodiment.

At block 406, a flow control message is received at the upstream network device from the downstream network device. For example, the flow control message 140 of FIG. 1 is received at the upstream network device, in an embodiment. In another embodiment, a suitable flow control message different from the flow control message 130 of FIG. 1 is received. In an embodiment, the flow control message indicates that particular one or more egress ports among the plurality of egress ports of the downstream network device are congested. In an embodiment, the flow control message is a PFC flow control message modified to include one or more fields to indicate the one or more congested egress ports at the downstream network device. In another embodiment, the flow control message is a quantized congestion notification (QCN) message statistically generated by the downstream network device based on level of congestion at the one or more egress ports of the downstream network device. In another embodiment, the flow control message is another suitable type of flow control message.

At block 408, responsive to the flow control message, the upstream network device modulates a flow of packets from particular one or more virtual output queues, among the respective virtual output queues, corresponding to the one or more particular congested egress ports of the downstream network device, to reduce congestion at the particular one or more congested egress port of the downstream network device. In an embodiment, the upstream network device modulates the flow of packets from the particular one or more virtual output queues without modulating the flow of packets from other one or more virtual output queues, among the plurality of virtual output queues, corresponding to other egress ports of the downstream network device.

Figure 5:
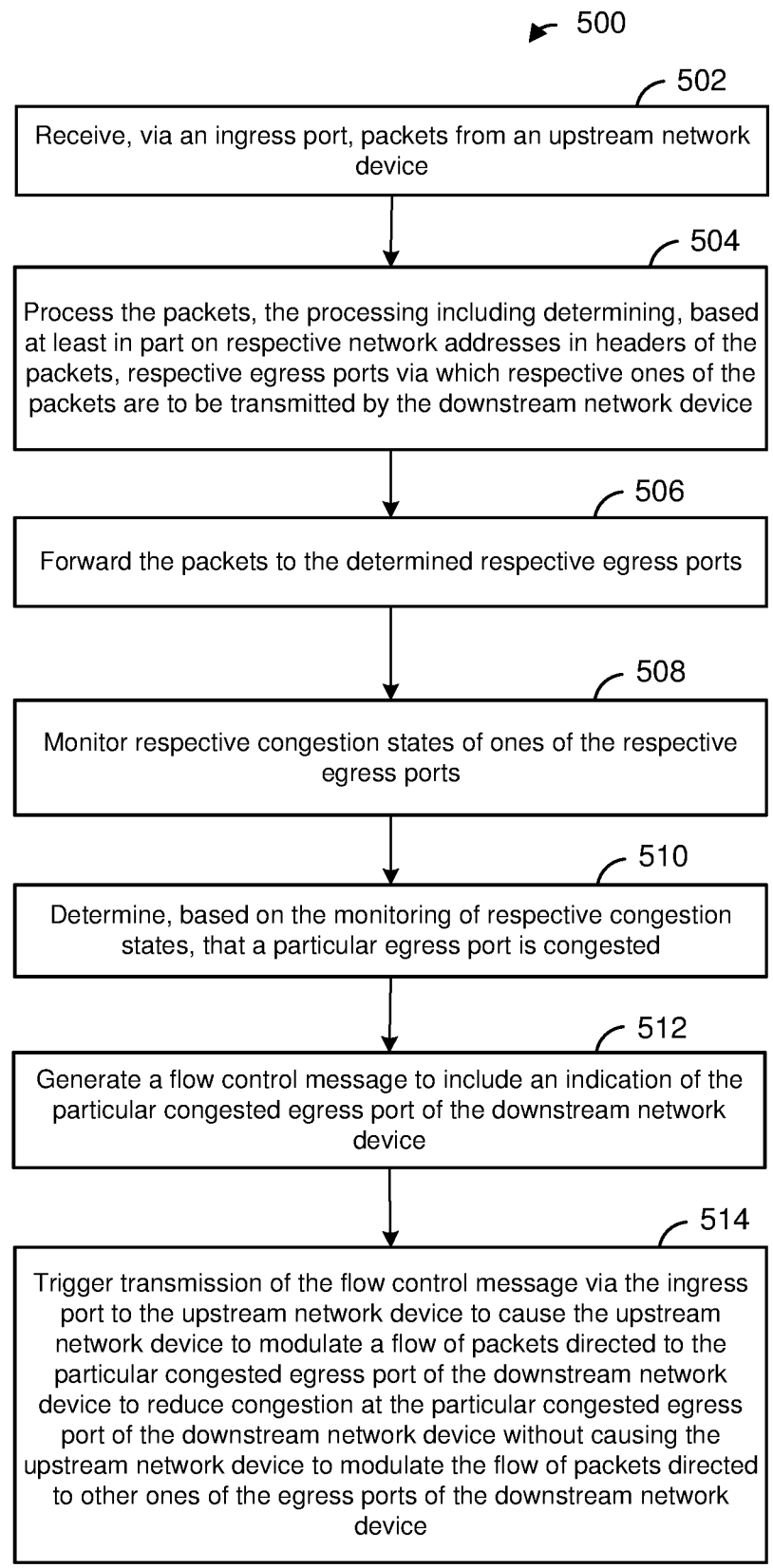
FIG. 5 is a flow diagram illustrating an example method for controlling congestion in a downstream network device in a switching system, according to an embodiment.

FIG. 5 is a flow diagram illustrating an example method 500 for controlling congestion in a downstream network device in a switching system, according to an embodiment. In an embodiment, the method 500 is implemented by the downstream network device 104-1 of the switching system 100 of FIG. 1, and, for ease of explanation, the method 500 is described below with reference to the downstream network device 104-1 of the switching system 100 of FIG. 1. However, the method 500 is implemented by suitable network devices different from the downstream network device 104-1 of the switching system 100 of FIG. 1 and/or is implemented in switching systems different from the switching system 100 of FIG. 1, in other embodiments.

At block 502, packets from one or more upstream network devices are received at the downstream network device 104-1. In an embodiment, the packets are received via at least one ingress port of the downstream network device. For example, in an embodiment, the packets are received by the downstream network device 104-1 from the upstream network derive 102-1 via the ingress port 122-*y* of the downstream network device 104-1. In another embodiment, at least some of the packets are received from upstream network devices other than the upstream network device 102-1 and/or via ingress ports 122 other than the ingress port 122-*y*.

At block 504, the packets received at block 502 are processed by the downstream network device 104-1. For example, the packets are processed by the packet processor 120 of the downstream network device 104-1, in an embodiment. In another embodiment, the packets are at least partially processed by another suitable component of the downstream network device 104-1. In an embodiment, processing of the packets includes determining respective egress ports 124 via which respective ones of the packets are to be transmitted by the downstream network device 104-1 to one or more subsequent network devices coupled to the respective one or more egress ports 124. In an embodiment, determination of the respective egress ports 124 via which respective ones of the packets are to be transmitted by the downstream network device 104-1 is made based on respective network addresses in headers of the packets. In other embodiments, determination of the respective egress ports via which respective ones of the packets are to be transmitted by the downstream network device is made additionally or alternatively based on other suitable information.

At block 506, the packets are forwarded to the respective egress ports 124, determined at block 504, for subsequent transmission of the packets via the respective egress ports to the one or more subsequent network devices coupled to the respective egress ports 124.

At block 508, the downstream network device 104-1 monitors congestion states of ones of the respective egress ports 124 of the downstream network device 104-1. For example, the congestion monitor 154 monitors the congestion states of the respective egress ports 124, in an embodiment. In another embodiments, another suitable component of the downstream network device 104-1 monitors the congestion states of the respective egress ports 124. In an embodiment, respective congestion states of ones the respective egress ports 124 are monitored independently from monitoring respective congestion states of other ones of the respective egress ports 124. In an embodiment, the respective congestion states of the respective egress ports 124 are monitored based on respective counts of packets that i) are temporarily stored in a packet memory of the downstream network device 104-1 and ii) are directed to the corresponding egress ports 124. In another embodiment, multiple congestion states of are monitored for each respective egress port 124, the particular congestion state of the multiple congestion states monitored based on a count of packets that i) are temporarily stored in a packet memory of the downstream network device 104-1, ii) are directed to the corresponding egress port 124, and iii) were received via a particular ingress port 122. In other embodiments, the respective congestion states of the respective egress ports 124 are monitored in other suitable manners.

At block 510 the downstream network device 104-1 determines, based on the monitoring of respective congestion states at block 508, that a particular egress port 124 of the downstream network device 104-1 is congested. For example, it is determined that the particular egress port 124 is congested when a count of packets that i) are temporarily stored in a packet memory of the downstream network device 104-1 and ii) are directed to the particular egress ports 124 exceeds a predetermined threshold. In another embodiment, it is determined that the particular egress port 124 is congested when a count of packets that i) are temporarily stored in a packet memory of the downstream network device 104-1, ii) are directed to the corresponding egress port 124, and iii) were received via a particular ingress port 122 exceeds a predetermined threshold. In other embodiments, the determination that the particular egress port 124 is congested is made in other suitable manners.

At block 512, in response to the determination that the particular egress port is congested at block 510, the downstream network device 104-1 generates a flow control message. For example, the downstream flow control engine 156 of the downstream network device 104-1 generates the flow control message, in an embodiment. In another embodiment, another suitable component of the downstream network device 104-1 generates the flow control message. The flow control message is generated to include an indication of the particular congested egress port 124 of the downstream network device 104-1, in an embodiment. In an embodiment, a modified PFC message is generated to include a field to indicate the particular congested egress port 124. In another embodiment, a QCN flow control message is generated. In other embodiments, other suitable types of flow control messages are generated.

At block 514, the flow control message is transmitted via the ingress port 122 to the upstream network device 102-1 to cause the upstream network device 102-1 to modulate the flow of packets directed to the particular congested egress port of the downstream network device 104-1 to reduce congestion at the particular congested egress port 124 of the downstream network device 104-1 without causing the upstream network device to modulate the flow of packets directed to other ones of the egress ports 124 of the downstream network device 104-1, in an embodiment.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for controlling flow of packets from an upstream network device in a switching system, the method comprising:
   processing, by a packet processor of the upstream network device, packets to be transmitted to a downstream network device in the switching system, the processing including determining, based at least in part on forwarding information subsequently used for forwarding the packets by the downstream network device to one or more subsequent network devices, respective one or more egress ports, among a plurality of egress ports of the downstream network device, via which the packets are to be subsequently transmitted by the downstream network device to the one or more subsequent network devices;
   temporarily storing the packets in respective virtual output queues among a plurality of virtual output queues formed in a memory of the upstream network device, the respective virtual output queues corresponding to the determined one or more egress ports of the downstream network device;
   receiving, at the upstream network device, a flow control message from the downstream network device, the flow control message indicating that particular one or more egress ports among the plurality of egress ports of the downstream network device are congested; and
   responsively to the flow control message, modulating a flow of packets from particular one or more virtual output queues, among the respective virtual output queues, corresponding to the one or more particular congested egress ports of the downstream network device, to reduce congestion at the particular one or more congested egress ports of the downstream network device, without modulating the flow of packets from other one or more virtual output queues, among the plurality of virtual output queues, corresponding to other egress ports of the downstream network device.

2. The method of claim 1, wherein modulating the flow of packets from the particular one or more virtual output queues corresponding to the one or more particular congested egress ports of the downstream network device comprises temporarily suspending transmission of packets from the particular one or more virtual output queues without temporarily suspending transmission of packets from the other one or more virtual output queues corresponding to the other egress ports of the downstream network device.

3. The method of claim 1, wherein modulating the flow of packets from the particular one or more virtual output queues corresponding to the one or more particular congested egress ports of the downstream network device comprises temporarily reducing a rate of transmission of packets from the particular one or more virtual output queues without temporarily reducing the rate of transmission of packets from the other one or more virtual output queues corresponding to the other egress ports of the downstream network device.

4. The method of claim 1, wherein determining an egress port, among the plurality of egress ports of the downstream network device, via which a particular packet among the packets is to be transmitted by the downstream network device to the subsequent network device includes obtaining, based at least in part on a network address in the particular packet, an indication from a remote forwarding database at the upstream network device of the egress port of the downstream network device, the remote forwarding database at the upstream network device storing information that associates i) network addresses with ii) egress ports of the downstream network device via which the packets are to be subsequently transmitted by the downstream network device to the one or more subsequent network devices.

5. The method of claim 4, further comprising
during operation of the downstream network device, receiving, at the upstream network device from the downstream network device, information that associates i) a network address with ii) one or more egress ports of the downstream network device via which packets that include the network address are to be subsequently transmitted by the downstream network device to the one or more subsequent network devices, and
storing the information in the remote forwarding database at the upstream network device.

6. The method of claim 4, wherein the remote forwarding database at the upstream network device is pre-programmed, by a software-defined networking (SDN) controller, to store information that associates i) a network address with ii) one or more egress ports of the downstream network device via which packets that include the network address are to be subsequently transmitted by the downstream network device to the one or more subsequent network devices.

7. The method of claim 1, wherein determining an egress port, among the plurality of egress ports of the downstream network device, via which a particular packet among the packets is to be transmitted by the downstream network device to the subsequent network device includes using a load balancing technique to select the egress port from among a set of possible egress ports for transmitting the packet from the downstream network device, wherein the load balancing technique corresponds to a load balancing technique to be subsequently used by the downstream network device to select the egress port from among the set of possible egress ports for transmitting the packet from the downstream network device.

8. The method of claim 1, wherein receiving, at the upstream network device, the flow control message from the downstream network device comprises receiving a modified priority flow control (PFC) message, the modified PFC message including one or more fields to indicate the one or more congested egress ports of the downstream network device.

9. The method of claim 1, wherein receiving, at the upstream network device, the flow control message from the downstream network device comprises receiving a quantized congestion notification (QCN) message generated by the downstream network device based on level of congestion at the one or more egress ports of the downstream network device.

10. The method of claim 1, wherein
the switching system comprises a datacenter switching network,
the upstream network device is a top of rack (ToR) device in the datacenter switching network, and
receiving the flow control message comprises receiving the flow control message from a spine device in the datacenter switching network.

11. An upstream network device configured to operate in a switching system, the upstream network device comprising:
at least one egress port for coupling to a downstream network device;
a memory storing a plurality of virtual output queues, respective ones of the virtual output queues corresponding to respective ones of a plurality of egress ports of the downstream network device; and
a packet processor implemented on one or more integrated circuits configured to
process packets to be transmitted to the downstream network device including determining, based at least in part on forwarding information subsequently used for forwarding the packets by the downstream network device to one or more subsequent network devices, respective one or more egress ports, among a plurality of egress ports of the downstream network device, via which the packets are to be subsequently transmitted by the downstream network device to the one or more subsequent network devices;
temporarily store the packets in respective virtual output queues, among the plurality of virtual output queues, corresponding to respective ones of the plurality of egress ports of the downstream network device, in the memory;
receive a flow control message from the downstream network device, the flow control message indicating that particular one or more egress ports among the plurality of egress ports of the downstream network device are congested; and
responsively to the flow control message, modulate a flow of packets from particular one or more virtual output queues, among the respective virtual output queues, corresponding to the one or more particular congested egress ports of the downstream network device, to reduce congestion at the particular one or more congested egress port of the downstream network device, without modulating the flow of packets from other one or more virtual output queues, among the plurality of virtual output queues, corresponding to other egress ports of the downstream network device.

12. The upstream network device of claim 11, wherein the one or more integrated circuits are configured to modulate the flow of packets from the particular one or more virtual output queues corresponding to the one or more particular congested egress ports of the downstream network device at least by temporarily suspending transmission of packets from the particular one or more virtual output queues without temporarily suspending transmission of packets from the other one or more virtual output queues corresponding to the other egress ports of the downstream network device.

13. The upstream network device of claim 11, wherein the one or more integrated circuits are configured to modulate the flow of packets from the particular one or more virtual output queues corresponding to the one or more particular congested egress ports of the downstream network device at least by temporarily reducing a rate of transmission of packets from the particular one or more virtual output queues without temporarily reducing the rate of transmission of packets from the other one or more virtual output queues corresponding to the other egress ports of the downstream network device.

14. The upstream network device of claim 11, wherein the one or more integrated circuits are configured to determine an egress ports, among the plurality of egress ports of the downstream network device, via which a particular packet among the packets is to be transmitted by the downstream network device to the subsequent network device at least by obtaining, based at least in part on a network address in the particular packet, an indication from a remote forwarding database at the upstream network device of the egress port of the downstream network device, the remote forwarding database at the upstream network device storing information that associates i) network addresses with ii) egress ports of the downstream network device via which the packets are to be subsequently transmitted by the downstream network device to the one or more subsequent network devices.

15. The upstream network device of claim 14, wherein the one or more integrated circuits are further configured to
during operation of the downstream network device, receive, from the downstream network device, information that associates i) a network address with ii) one or more egress ports of the downstream network device via which packets that include the network address are to be subsequently transmitted by the downstream network device to the one or more subsequent network devices, and
store the association in the remote forwarding database at the upstream network device.

16. The upstream network device of claim 14, wherein the remote forwarding database at the upstream network device is pre-programmed, by a software-defined networking (SDN) controller, to store the information that associates i) a network address with ii) one or more egress ports of the downstream network device via which packets that include the network address are to be subsequently transmitted by the downstream network device to the one or more subsequent network devices.

17. The upstream network device of claim 14, wherein the one or more integrated circuits are configured to determine an egress port, among the plurality of egress ports of the downstream network device, via which a particular packet among the packets is to be transmitted by the downstream network device to the subsequent network device at least by using a load balancing technique to select the egress port from among a set of possible egress ports for transmitting the packet from the downstream network device, wherein the load balancing technique corresponds to a load balancing technique to be subsequently used by the downstream network device to select the egress port from among the set of possible egress ports for transmitting the packet from the downstream network device.

18. The upstream network device of claim 11, wherein the flow control message is a modified priority flow control (PFC) message, the modified PFC message including one or more fields to indicate the one or more congested egress ports of the downstream network device.

19. The upstream network device of claim 11, wherein the flow control message is a quantized congestion notification (QCN) message generated by the downstream network device based on level of congestion at the one or more egress ports of the downstream network device.

20. The upstream network device of claim 11, wherein
the switching system comprises a datacenter switching network,
the upstream network device is a top of rack (ToR) device in the datacenter switching network, and
the downstream network device is a spine device in the datacenter switching network.

* * * * *